Sept. 26, 1961        L. R. KOLLER        3,001,892
EVAPORATION METHOD AND APPARATUS
Filed March 26, 1958
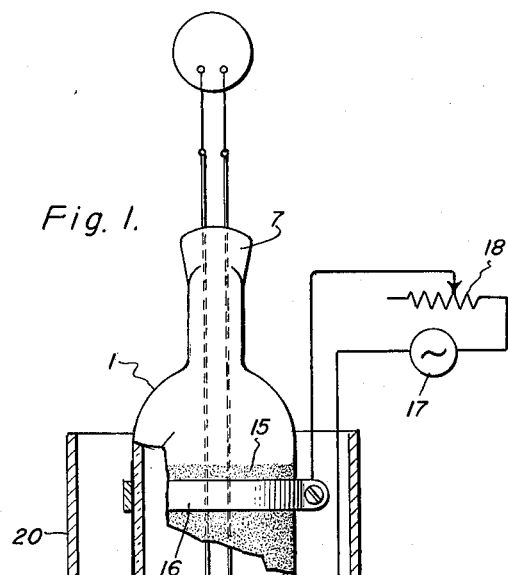
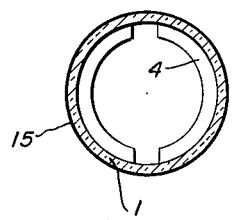
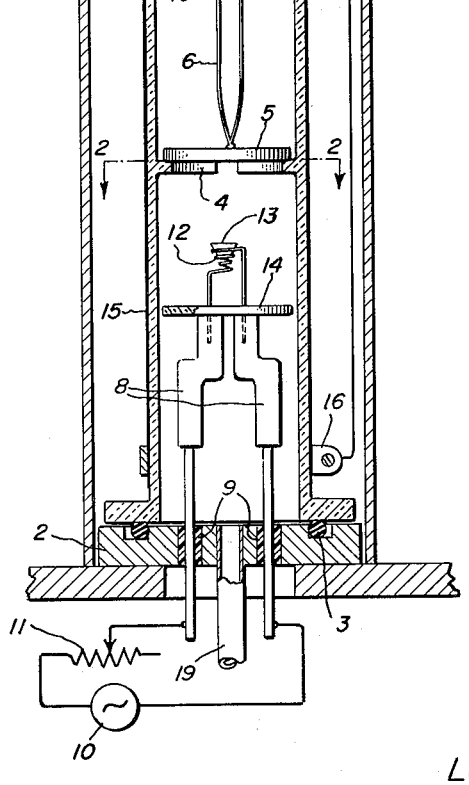
Inventor:
Lewis R. Koller,
by John F. Ahern
His Attorney.

United States Patent Office 3,001,892
Patented Sept. 26, 1961

3,001,892
EVAPORATION METHOD AND APPARATUS
Lewis R. Koller, Schenectady, N.Y., assignor to General
Electric Company, a corporation of New York
Filed Mar. 26, 1958, Ser. No. 724,149
10 Claims. (Cl. 117—106)

The present invention relates to improved vacuum evaporation apparatus. More particularly, the invention relates to apparatus for evaporating luminescent phosphor material and subsequently condensing these materials upon a heated substrate.

In the luminescent screen arts, the vacuum evaporation technique for forming thin films is becoming increasingly important. This is due, in part, to the fact that luminescent screens formed by vacuum evaporation are generally transparent, homogeneous, and controllably thin. Many difficulties, however, arise in forming luminescent films having good light emitting characteristics by vacuum evaporation. I have found that improved apparatus facilitates the formation of films having improved luminescent characteristics.

Accordingly, one object of the present invention is to provide improved vacuum evaporation apparatus and method.

A further object of the invention is to provide vacuum evaporation apparatus capable of forming improved luminescent films.

In accord with the present invention, I provide vacuum evaporation apparatus in which the evaporated substance is confined to a small volume, one boundary of which is the evaporation substrate. The substrate is heated by radiation from the apparatus walls which are directly heated. Under these conditions, the evaporated material is condensed upon the evaporation substrate at high temperatures, forming thin phosphor films having high luminescent efficiency.

The novel features believed characteristic of the invention are set forth in the appended claims. The invention itself, together with further objects and advantages thereof, may best be understood with reference to the drawing in which:

FIG. 1 is a partially schematic vertical cross-sectional view of an apparatus constructed in accord with the present invention; and FIG. 2 is a cross-sectional view along the line 2—2 in FIG. 1.

Luminescent phosphors are crystalline substances possessing an ordered crystal lattice which may initially possess imperfections therein. For the formation of good phosphors, however, it is essential that the host phosphor comprising the crystal lattice should be as free from crystalline imperfections as is possible. In the formation of luminescent phosphor films by evaporation and condensation of the phosphor upon a suitable substrate, it is, therefore, essential that the condensing material should enter the newly formed layer in an orderly fashion producing an ordered array of phosphor crystals. I have found, for the substances comprising luminescent phosphors, that the above condition of ordered deposition of phosphor crystals on the growing film is greatly favored if the evaporation substrate or base plate, upon which the film is formed, is maintained at as high a temperature as possible. The limit of how high the temperature may be maintained is generally the temperature at which the material comprising the phosphor re-evaporates, or the glass substrate softens.

In the evaporation apparatus of the prior art, it has been extremely difficult, if not impossible, to effectively evaporate and condense phosphor material upon a substrate which is maintained at a temperature sufficiently high to form an ordered crystal of array sufficient to give good luminescent properties. This is because in the usual system in which an evaporating boat is suspended under an evaporation substrate, and the boat is heated as is the substrate, there is a critical temperature above which the evaporated material will not condense upon the substrate. Rather, the material preferentially segregates out and condenses upon the cool unheated walls of the evaporation apparatus, generally a bell jar.

In accord with my present invention, I have found that the evaporation substrate temperature may be maintained as high as 700° C., thus facilitating the formation of phosphor material in an orderly array, by maintaining the temperature of the walls of the evaporation apparatus immediately surrounding the evaporation boat and the evaporation substrate at a temperature in excess of the temperature of the evaporation substrate.

One apparatus constructed in accord with the present invention is illustrated in the drawing. In the drawing, the apparatus comprises a long bell jar 1, preferably cylindrical, which rests upon a support disk 2 and is vacuum sealed thereto with an O-ring 3. Substantially mid-way along the length of bell jar 1 there is mounted on the interior thereof an annular support ring 4 slotted to allow an evaporation substrate, in the form of a disk, to be passed therethrough, suitable for supporting a vitreous disk 5 upon which a phosphor layer is to be formed by evaporation and condensation.

Support member 4 is shown in cross-section in FIG. 2 which is a horizontal view taken along line 2—2 of FIG. 1. Although support means for substrate 5 is herein shown to be integral with bell jar 1, it will be appreciated that such means could be attached to support disk 2. It is immaterial how the means is supported, so long as the support means serves to prevent evaporated phosphor from escaping to the region above disk 5.

A thermocouple 6 is connected with substrate 5 for measuring the temperature thereof and passes through the apparatus through a vacuum seal 7 at the upper end of the bell jar. A pair of conducting support members 8 extends through suitable vacuum tight insulated members in support plate 2 and are connected with a suitable source of potential as represented generally by A.C. generator 10 and potentiometer 11. An evaporation boat 12, in this instance, in the form of a tapered inverted coil, is supported between the interior ends of conducting members 8. Evaporation boat 12 is adapted to hold a pellet 13 of the substance which is to be evaporated therefrom. Other forms of boats, as for example cup shaped members, may be used. A suitable baffle 14 is mounted to conducting support members 8 below evaporation boat 12 and is shaped to match substantially identically the interior dimension and shape of bell jar 1. This baffle prevents any of the evaporated material from escaping down along conducting lead members 8. The entire exterior lateral surface of bell jar 1 from a region below bafflle 14 to a region above the position of evaporation substrate 5 is coated with a thin resistance coating 15 which is contacted with a pair of ring electrodes 16 which, in turn, are connected to a source of potential represented generally by alternating current generator 17 and potentiometer 18. Resisitive coating 15 serves as a heater when an electric current is passed therethrough by means of ring electrodes 16, and is the only means by which evaporation substrate 5 is heated in accord with the present invention . This suitable low pressure is maintained within the entire apparatus by connecting vacuum line 19 to a suitable vacuum pump (not shown). A suitable heat shield 20 may enclose the apparatus and reduce thermal losses.

Although the bell jar 1 may, in certain instances, comprise Pyrex, Vycor, or other high temperature glasses, I preferably utilize quartz therefor since resistive layers which serve as the substrate heaters resist deterioration upon quartz surfaces at higher temperatures than they resist deterioration upon glass surfaces. The materials from which support members 8 and evaporation boat 12 are fabricated are not critical and may conveniently be tungsten, molybdenum, platinum or any other material conveniently utilized in this application. Resistance coating 15 upon the surface of bell jar 1 may conveniently be tin oxide formed by hydrolysis of tin tetrachloride. Alternative coating 15 may be composed of titanium dioxide, formed by spraying titanium tetrachloride upon the glass substrate in a moist atmosphere when heated to a temperature of approximately 150–250° C.

Since the only heating to which substrate 5 is subjected is radiation from the heated walls of the bell jar, the substrate is bound to be at a lower temperature than the walls of the jar. Thus, since it is well known that vapors condense preferentially upon cooler surfaces, the vapors within the vicinity of the substrate preferentially condense upon the substrate surface. Under these conditions I have found it possible to form zinc sulfide layers when the substrate is maintained at a temperature of up to 700° C. This is in comparison to a temperature of approximately 400° C. if the substrate is heated, as for example by a resistance heater immediately upon the other side thereof. Heating the evaporation substrate by maintaining the only primary source of heat as the walls of the bell jar also prevents bell jar wall from becoming clouded with condensed material and reduces to an absolute minimum the amount of material which must be evaporated from boat 12 in order to form the desire thickness layer upon substrate 5.

Since zinc sulfide forms an ideal or optimized crystal lattice structure, giving rise to optimized luminescence characteristics when formed upon a substrate maintained at a temperature of approximately 500–600° C. it is apparent that raising the maximum temperature of the substrate at which sulfide phosphors may be condensed from the prior art value of 400° C. to a new maximum value of 700° C. facilitates the formation of efficient luminescent zinc sulfide phosphors where the formation of such phopshors by evaporation techniques was heretofore difficult, if not impossible.

Another feature of the present invention lies in forming the apparatus thereof so that the surface of the substrate to be coated with a phosphor layer and the evaporation boat are in a small, substantially closed chamber. This prevents the escape of evaporated phosphor materials away from the substrate and the subsequent condensation thereof on a colder surface. Thus, in accord with a preferred embodiment of my invention, the walls of the evaporation jar are made a part of a cylinder having a diameter substantially the same as the outside diameter of the disk upon which the phosphor is to be deposited. A substantially closed cylindrical volume is formed by the placing of a preferably non-metallic baffle immediately below the evaporation boat. Since the baffle (although cold as compared with the substrate) is below the evaporation boat and the thermal energy of evaporated particles causes them to rise, very little if any phosphor is deposited upon the baffle, the vast majority of phosphor particles being condensed upon the undersurface of the substrate.

While, in the preferred embodiment of the invention, the means for heating the reaction chamber walls is disclosed as a resistive film 15, it is apparent that the same function may be satisfied by other heating means in close juxtaposition to the chamber wall. Thus, for example, the area around the chamber walls may be wrapped with a suitable resistance wire, covering susbtantially the same area covered by resistive film 15 in FIG. 1 of the drawing.

The area covered by the resistive film, or its equivalent, in FIG. 1 is not critical for very small diameter plates. In this case, all that is necessary is that the heated area extend from a region below baffle 14 to a region above substrate 5. For larger installations, however, I prefer that in addition to satisfying this condition, the area of the heater satisfy the condition that the heater extend for at least twice the diameter of the reaction chamber above the substrate and a like distance below the substrate.

While the invention has been disclosed hereinbefore with respect to one embodiment thereof, many modifications and changes will readily become apparent to those skilled in the art. Accordingly, I intend to cover by the appended claims all such modifications and changes that fall within the true spirit and scope of my invention.

What I claim as new and desire to secure by Letters Patent of the United States is:

1. Apparatus for evaporating and condensing evaporable material upon a heated base plate comprising: an evaporation boat for containing and supporting material to be evaporated; first heating means in close thermal relationship with said evaporation boat and substantially thermally isolated from said base plate for raising the temperature of said evaporation boat to a value sufficient to cause the evaporation of material held thereby; means defining walls of an evacuable reaction chamber closely surrounding said boat; means within said chamber for supporting said plate in a substantially horizontal position over said evaporation boat and for preventing the upward escape of vaporized material between said plate and said reaction chamber walls; closure means below said evaporation boat for preventing the downward escape of vaporized material; and second heating means in close thermal relationship with said reaction chamber walls and substantially thermally isolated from said evaporation boat for heating the walls of said chamber over a region from above said plate to a region below said evaporation boat.

2. Apparatus for evaporating and condensing evaporable materials upon a heated base plate comprising: an evaporation boat for containing and supporting the material to be evaporated; first heating means in close thermal relationship with said evaporation boat and substantially thermally isolated from said base plate for raising the temperature of said evaporation boat to a value sufficient to cause the evaporation of material held thereby; closure means located below said evaporation boat for preventing the downward escape of vaporized material; means defining an evacuable reaction chamber closely surrounding said boat and said closure means and comprising an elongated cylinder; means within said chamber for supporting said plate in a substantially horizontal position above said evaporation boat and closing the interior of said cylinder to prevent the escape of vaporized material between said plate and said reaction chamber; and second heating means in close thermal relationship with said reaction chamber and substantially thermally isolated from said evaporation boat for heating the lateral walls of said chamber over a region from above said plate to a region below said closure means.

3. Apparatus for evaporating and condensing evaporable materials upon a heated base plate comprising: an evaporation boat for containing and supporting the material to be evaporated; first heating means in close thermal relationship with said evaporation boat and substantially thermally isolated from said base plate for raising the temperature isolated from said base plate of said evaporation boat sufficient to cause the evaporation to cause the evaporation of material held thereby; a baffle member located below said evaporation boat for preventing the downward escape of vaporized material; means defining an evacuable reaction chamber closely surrounding said boat and said baffle, and comprising a refractory cylinder, means within said chamber for supporting said plate in a substantially horizontal position over said evaporation boat and for preventing the escape of vaporized material between said plate and said reaction chamber; and second means in close thermal relationship to said reaction chamber and substantially thermally isolated from said evaporation boat for heating the lateral walls of said chamber over a region from above said plate to a region below said baffle and comprising a thin film of moderately conducting substance coating the wall of said reaction chamber.

4. Apparatus for evaporating and condensing evaporable materials upon a heated base plate comprising: an evaporation boat for containing and supporting the material to be evaporated; first heating means in close thermal relationship with said evaporation boat and substantially thermally isolated from said base plate for raising the temperature of said evaporation boat to a value sufficient to cause the evaporation of material held thereby; a baffle member located below said evaporation boat for preventing the downward escape of vaporized material, means defining an evacuable reaction chamber closely surrounding said boat and said baffle and comprising a quartz cylinder; means within said chamber for supporting said plate in a substantially horizontal position over said evaporation boat and for preventing the upward escape of vaporized material between said plate and said reaction chamber; and second heating means in close thermal relationship to said reaction chamber and substantially thermally isolated from said evaporation boat for heating the lateral walls of said chamber over a region from above said plate to a region below said baffle and comprising a thin resistance film coating the wall of said quartz cylinder.

5. Apparatus for evaporating and condensing evaporable materials upon a heated base plate comprising: an evaporation boat for containing and supporting material to be evaporated; first heating means in close thermal relationship with said evaporation boat and substantially thermally isolated from said base plate for raising the temperature of said evaporation boat to a value sufficient to cause the evaporation of material held thereby; means defining walls of an evacuable reaction chamber closely surrounding said boat; means within said chamber for supporting said plate in a substantially horizontal position over said evaporation boat and for preventing the upward escape of vaporized material between said plate and said reaction chamber walls; closure means below said evaporation boat for preventing the downward escape of vaporized material; and second heating means in close thermal relationship with said reaction chamber walls and substantially thermally isolated from said evaporation boat for heating the walls of said chamber over a region from above said plate to a region below said evaporation boat, said region extending a distance of at least twice the diameter of said chamber above and below said base plate.

6. The method of coating thin films of evaporable materials having a high degree of crystal perfection upon a heated substrate which method comprises: exposing the surface of said substrate to be coated to the interior of an evacuable enclosure; heating a quantity of material with which said substrate is to be coated within said substrate to a first temperature sufficient to cause the evolution of vapors thereof; and simultaneously and, independently of the heating of said quantity of material, heating the walls of said enclosure, including said substrate, to a second temperature below said first temperature and sufficiently high to facilitate the formation of high perfection crystalline layers of said material upon said substrate.

7. The method of coating thin films of evaporable materials having a high degree of crystal perfection upon a heated substrate which method comprises: exposing the surface of said substrate to be coated to the interior of an evacuable enclosure; heating a quantity of material with which said substrate is to be coated within said enclosure to a first temperature sufficiently high to cause the evolution of the vapors thereof; and simultaneously and independently of the heating of said material, heating the walls of said enclosure, including said substrate, so as to raise the temperature of said substrate to a value of 500° to 700° C.

8. The method of coating thin films of evaporable material of high crystal perfection upon a heated substrate which method comprises: exposing the surface of said substrate to be so coated in an evacuable enclosure; heating a quantity of material of which said coating is to be formed within said enclosure to a temperature sufficiently high to cause the evolution of vapors therefrom; and, simultaneously with and independently of the heating of said material, heating the walls of said enclosure so as to thereby heat said substrate and concurrently insure that no portion of said enclosure is lower in temperature than the temperature of said substrate.

9. The method of coating thin films of evaporable materials upon a heated substrate which method comprises exposing the surface of said substrate to be so coated in an evacuable enclosure; evaporating within said enclosure the material of which said film is to be formed by application of a first heating means thereto; and simultaneously and independently heating the walls of said enclosure by a second heating means to a temperature sufficient to raise by radiation the temperature of said substrate to a temperature below the temperature of said walls and sufficiently high to facilitate the formation of high perfection crystalline layers thereupon.

10. The method of coating thin films of evaporable materials of high crystalline perfection upon a heated substrate which method comprises: suspending said substrate and an evaporation vessel containing the material to be evaporated in an evacuable chamber having a smaller-volume portion defined by portions of the walls of said chamber, by said substrate, and by a baffle member maintained below said evaporation boat; heating the walls of said evacuable chamber encompassing at least said smaller-volume portion to a first temperature so as to maintain said substrate at a second temperature below said first temperature by radiation from said heated walls; and heating said evaporation vessel independently of the heating of said walls to a third temperature sufficient to cause the evaporation of material within said vessel.

References Cited in the file of this patent

UNITED STATES PATENTS

| | | |
|---|---|---|
| 1,584,728 | Case | May 18, 1926 |
| 2,143,723 | Walker et al. | Jan. 10, 1939 |
| 2,793,609 | Shen et al. | May 28, 1957 |
| 2,936,246 | Coghill | May 10, 1960 |

FOREIGN PATENTS

| | | |
|---|---|---|
| 766,119 | Great Britain | Jan. 16, 1957 |